United States Patent [19]

Plichta et al.

[11] Patent Number: 5,278,004
[45] Date of Patent: Jan. 11, 1994

[54] THERMAL CELL INCLUDING A SOLID STATE ELECTROLYTE

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 28,851

[22] Filed: Mar. 10, 1993

[51] Int. Cl.⁵ .......................................... H01M 10/39
[52] U.S. Cl. .................................. 429/191; 429/193; 429/218
[58] Field of Search ............... 429/191, 193, 112, 103, 429/104, 218; 252/62.2

[56] References Cited

U.S. PATENT DOCUMENTS

| | | | |
|---|---|---|---|
| 4,513,070 | 4/1985 | Carette et al. | 429/193 |
| 4,599,284 | 7/1986 | Akridge | 429/191 |
| 5,006,430 | 4/1991 | Duclot et al. | 429/191 |
| 5,141,827 | 8/1992 | Fritz et al. | 429/191 |
| 5,154,990 | 10/1992 | Plichta et al. | 429/191 |

Primary Examiner—Anthony Skapars
Attorney, Agent, or Firm—Michael Zelenka; Roy E. Gordon

[57] ABSTRACT

A solid solution of lithium germanium oxide and lithium vanadium oxide is included as a solid state electrolyte in a thermal electrochemical cell.

4 Claims, 3 Drawing Sheets ically conductive molten salts including
mixtures of lithium halides as electrolytes.

THERMAL CELL INCLUDING A SOLID STATE ELECTROLYTE

GOVERNMENT INTEREST

The invention described herein may be manufactured, used, and licensed by or for the Government for governmental purposes without the payment to us of any royalties thereon.

FIELD OF INVENTION

The invention relates in general to high temperature thermal electrochemical cells and in particular to high temperature thermal electrochemical cells including a solid state electrolyte.

BACKGROUND OF THE INVENTION

High temperature thermal cells are required for application in fuses, projectile rockets, bombs, missiles, decays, jammers and torpedoes. Heretofore, these cells have used highly conductive molten salts including mixtures of lithium halides as electrolytes.

To date, solid electrolytes have not been used as electrolytes for thermal cells because of their low ionic conductivities and low discharge rates at which solid electrolyte cells can be operated.

SUMMARY OF THE INVENTION

The general object of this invention is to provide a highly conducting solid electrolyte for thermal electrochemical cells that will replace the highly corrosive molten salt electrolytes presently used in thermal cells.

It has now been found that the aforementioned object can be attained by using a solid solution of lithium germanium oxide and lithium vanadium oxide having a general formula, $Li_{3.6} Ge_{0.6} V_{0.4} O_4$ and possessing conductivities of the order of about 0.08S/cm at 300° C. as the solid electrolyte in thermal cells using lithium alloys (LiAl) as the anode and transition metal sulfides (TiS$_2$) as the cathodes. These thermal cells can be operated at current densities up to 100mA/cm$^2$ at 300° C.

The use of solid electrolytes in place of molten salts also results in ease of fabrication and use of less expensive container materials as compared to container materials required for containing the corrosive molten salts.

DESCRIPTION OF THE DRAWING AND THE PREFERRED EMBODIMENT

Figure 1:
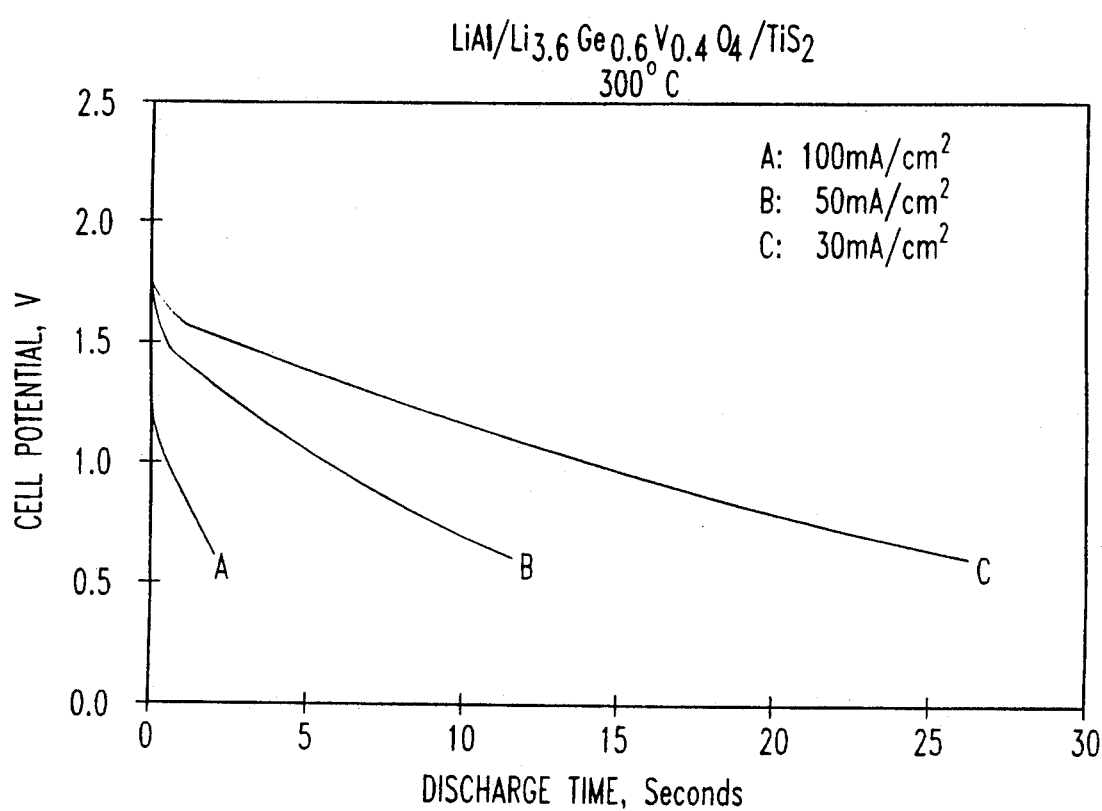
FIG. 1 shows the discharge curves of an electrochemical cell using a lithium-aluminum (48 atomic percent lithium Li) alloy as the anode, a solid solution of lithium germanium oxide (LiGeO$_4$) and lithium vanadium oxide (LiVO$_4$) having a general formula $Li_{3.6} Ge_{0.6} V_{0.4} O_4$ as the solid electrolyte and titanium disulfide as the cathode active material on discharge at current densities of 30, 50 and 100 mA cm$^2$ at an operating temperature of 300° C.

The thermal electrochemical cell described herein is the cell as described heretofore in the brief description of the drawing. On discharge, lithium ions generated at the lithium alloy electrode are transported through the lithium ion conducting solid electrolyte and are intercalated into the lattice of the titanium disulfide cathode on charge, these electrode reactions are reversed. The total cell reaction on discharge and charge may be represented as:

$$xLiAl + TiS_2 \rightleftharpoons Li_xTiS_2 + XAl$$

where x represents the fraction of lithium intercalated into the titanium disulfide cathode. The electrochemical cell includes a three pellet stack of anode, electrolyte and cathode held together by a spring loaded cell design. The lithium alloy anode and solid electrolyte pellets are 190 microns thick and are prepared by pressing their respective powders in a ½ inch diameter steel die to a 10 ton pressure. The active cathode material includes a 5 micron thick thin film of titanium disulfide obtained on an aluminum substrate by chemical vapor deposition. Molybdenum disks placed on each side of the cell stack are used as current collectors.

Referring to FIG. 1, the average mid discharge voltages at these current densities of 30, 50, and 100 mA/cm$^2$ are respectively found to be 1.03, 0.98 and 0.82V. The energy densities based on cathode weights are found to be 542, 453 and 133 KJ/KG at current densities of 30, 50 and 100 mA/cm$^2$, respectively.

Figure 2:
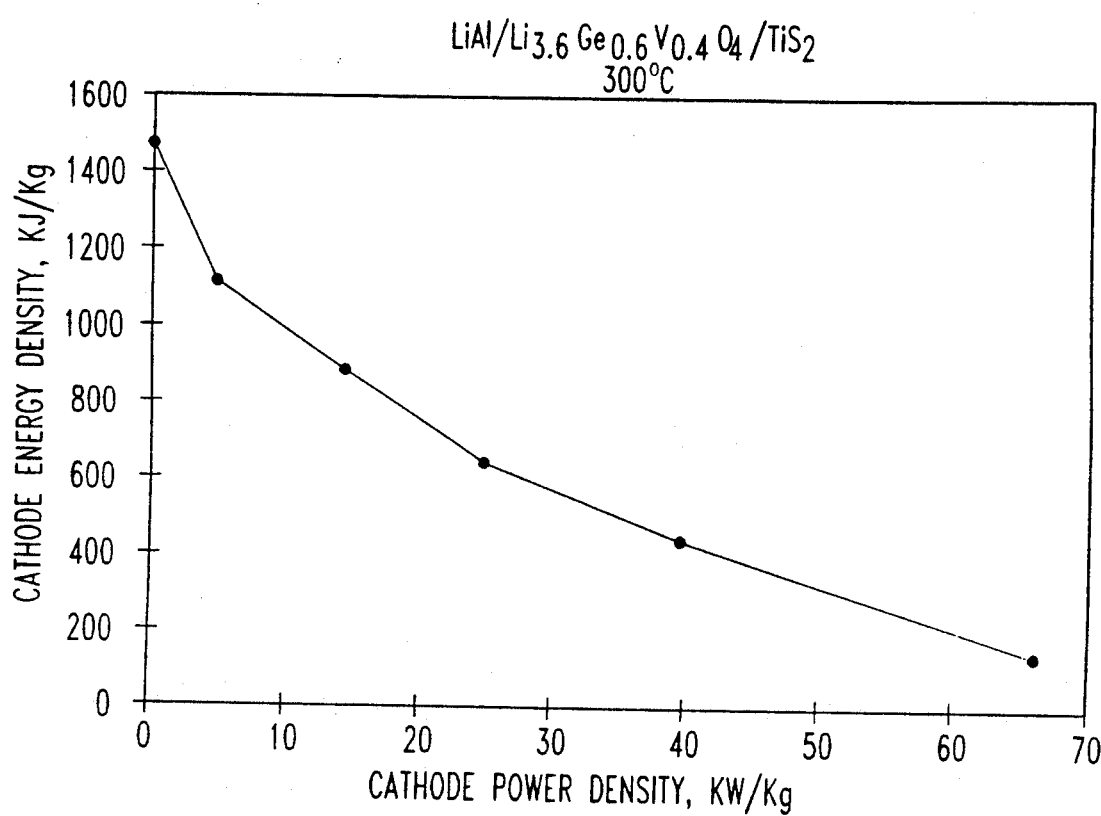
FIG. 2 shows the cathode energy density as a function of cathode power density obtained with the cell LiAl/Li$_{3.6}$Ge$_{0.6}$ V$_{0.4}$O$_4$/TiS$_2$ operated at 300° C.

Referring to FIG. 2, the cathode energy density is shown as a function of cathode power density obtained with the cell LiAl/Li$_{3.6}$Ge$_{0.6}$V$_{0.4}$O$_4$/TiS$_2$ operated at 300° C.

Figure 3:
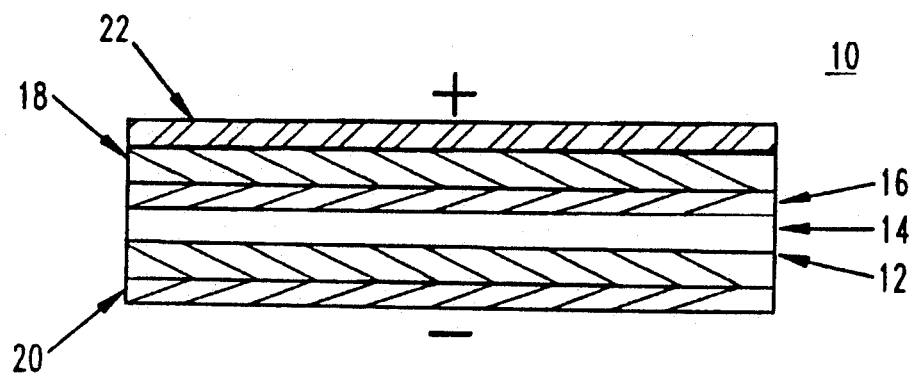
FIG. 3 shows the structure of the LiAl/Li$_{3.6}$Ge$_{0.6}$V$_{0.4}$O$_4$/TiS$_2$ thermal electrochemical cell operated at 300° C.

Referring to FIG. 3, an electrochemical cell, 10 includes a three pellet stack of an anode, 12, an electrolyte, 14 and a cathode, 16 held together by a spring loaded cell design (not shown). The lithium alloy anode, 12 and solid electrolyte pellets, 14 and 190 microns thick and are prepared by pressing their respective powders in a ½ inch diameter steel die to a ten ton pressure. The active cathode material, 16 includes a 5 micron thick thin film of titanium disulfide obtained on an aluminum substrate, 18 by chemical vapor deposition mdybdenum disks, 20 and 22 respectively are placed on each side of the cell stack and are used as current collectors.

In lieu of TiS$_2$ as the cathode material, one might use other materials such as FeS$_2$, CuS$_2$, NiS$_2$, LiCoO$_2$, LiNiO$_2$, LiMnO$_2$, V$_6$O$_{13}$, V$_2$O$_5$, Cr$_3$O$_8$, V$_2$S$_5$, MoS$_2$, MoS$_3$, NbSe$_3$, VSe$_2$, AgF, CuCl$_2$, and CuCl, and NkF$_2$. Thus, suitable cathode materials include other transition metal halides, chalcogenides, selenides, tellurides, and oxides.

Other possible solid electrolyte compositions that can be substituted for Li$_{3.6}$Ge$_{0.6}$V$_{0.4}$O$_4$ include other solid solutions of Li$_4$GeO$_4$-Li$_3$VO$_4$, Li$_{3.75}$ Si$_{0.75}$P$_{0.25}$O$_4$, Li$_{3.4}$ Si$_{6.7}$ S$_{0.3}$ O$_4$, Li$_{2.25}$ C$_{0.75}$ B$_{0.25}$ O$_3$, and Li$_{14}$ Zn Ge$_4$O$_{16}$, as well as other lithium ion conducting solid state materials.

In lieu of LiAl as the anode material, one might use LiSi, LiB, LiC$_6$, Li$_2$TiS$_2$, LiVSe$_2$ and other lithium containing compounds suitable for use as anodes.

We wish it to be understood that we do not desire to be limited to the exact details of construction shown and described for obvious modifications will occur to a person skilled in the art.

What is claimed is:

1. A thermal electrochemical cell including a lithium ion conducting solid solution as its electrolyte wherein the lithium ion conducting solid solution electrolyte is selected from the group consisting of solid solutions of $Li_4GeO_4$-$Li_3VO_4$, $Li_{3.75}Si_{0.75}P_{0.25}O_4$, $Li_{3.4}Si_{0.7}S_{0.3}O_4$, $Li_{2.25}C_{0.75}B_{6.25}Ge_3$ and $Li_{14}ZnGe_4O_{1.6}$.

2. A thermal electrochemical cell including a lithium ion conducting solid solution as its electrolyte wherein the lithium ion conducting solid solution is selected from the group consisting of solid solutions of $Li_4GeO_4$-$Li_3VO_4$, $Li_{3.75}Si_{0.75}P_{0.25}O_4$, $Li_{3.4}Si_{0.7}S_{0.3}O_4$, $Li_{2.25}C_{0.75}B_{6.25}Ge_3$ and $Li_{14}ZnGe_4O_{1.6}$, and wherein the lithium ion conducting solid solution electrolyte is a solid solution of lithium germanium oxide and lithium vanadium oxide having the general formula $Li_4GeO_4$-$Li_3VO_4$.

3. A thermal electrochemical cell including a lithium ion conducting solid solution as its electrolyte where in the lithium ion conducting solid solution electrolyte is selected from the group consisting of solid solutions of $Li_4GeO_4$-$Li_3VO_4$, $Li_{3.75}Si_{0.75}P_{0.25}O_4$, $Li_{3.4}Si_{0.7}S_{0.3}O_4$, $Li_{2.25}C_{0.75}B_{6.25}Ge_3$ and $Li_{14}ZnGe_4O_{1.6}$, and wherein the lithium ion conducting solid solution electrolyte is a solid solution of lithium germanium oxide and lithium vanadium oxide having the general formula $Li_4GeO_4$-$Li_3VO_4$, and including a lithium containing compound selected from the group consisting of LiAl, LiSi, LiB, $LiC_6$, $Li_2TiS_2$, and $LiVSe_2$ as the anode, and a compound selected from the group consisting of $TiS_2$, $FeS_2$, $CoS_2$, $NiS_2$, $LiCoO_2$, $LiNiO_2$, $LiMnO_2V_6O_{13}$, $Cr_3O_8$, $V_2S_5$, $MoS_2$, $MoS_3$, $MbSe_3$, $VS_2$, $AgF$, $CuF_2$, $CuCl_2$, $CuCl$, and $MF_2$ as the cathode.

4. A thermal electrochemical cell including a lithium ion conducting solid solution as its electrolyte wherein the lithium ion conducting solid solution electrolyte is a solid solution of lithium germanium oxide and lithium vanadium oxide having the general formula $Li_{3.6}Ge_{0.6}V_{0.4}O_4$, and wherein $TiS_2$ is the cathode and LiAl is the anode.

* * * * *

UNITED STATES PATENT AND TRADEMARK OFFICE
CERTIFICATE OF CORRECTION

PATENT NO. : 5,278,004
DATED : Jan. 11, 1994
INVENTOR(S) : EDWARD J. PLICHTA and WISHVENDER K. BEHL It is certified that error appears in the above-indentified patent and that said Letters Patent is hereby corrected as shown below:

Column 1, line 36, equation "VO.4" should read --$V_{0.4}$--;

Column 2, line 26, "KJ/KG" should read --kJ/kg--;

line 46, equation "LiCOo$_2$" should read --LiCoO$_2$--;

line 48, equation "NkF$_2$" should read --NiF$_2$--;

Column 3, line 16, "where in" should read --wherein--;

Column 4, line 9, after equation "LiMnO$_2$" insert --,--;

line 11, equation "MF$_2$" should read --NiF$_2$--.

Signed and Sealed this

Thirteenth Day of September, 1994

*Attest:*

BRUCE LEHMAN

*Attesting Officer*   *Commissioner of Patents and Trademarks*